United States Patent
Ihle et al.

(10) Patent No.: US 12,259,283 B2
(45) Date of Patent: Mar. 25, 2025

(54) SENSOR ARRANGEMENT AND METHOD FOR PRODUCING A SENSOR ARRANGEMENT

(71) Applicant: TDK Electronics AG, Munich (DE)

(72) Inventors: Jan Ihle, Raaba-Grambach (AT); Torben Seifert, Stainz (AT); Sasa Sabeder-Daiminger, Maribor (SI); Gerhard Hojas, Sankt Johann (AT)

(73) Assignee: TDK ELECTRONICS AG, Munich (DE)

( * ) Notice: Subject to any disclaimer, the term of this patent is extended or adjusted under 35 U.S.C. 154(b) by 563 days.

(21) Appl. No.: 17/639,236

(22) PCT Filed: Oct. 13, 2021

(86) PCT No.: PCT/EP2021/078297
§ 371 (c)(1),
(2) Date: Feb. 28, 2022

(87) PCT Pub. No.: WO2022/079094
PCT Pub. Date: Apr. 21, 2022

(65) Prior Publication Data
US 2023/0160759 A1    May 25, 2023

(30) Foreign Application Priority Data
Oct. 13, 2020   (DE) .......................... 102020126833.5

(51) Int. Cl.
*G01K 1/12*   (2006.01)
*G01K 7/08*   (2006.01)
(Continued)

(52) U.S. Cl.
CPC ................. *G01K 7/22* (2013.01); *G01K 1/12* (2013.01); *G01K 7/08* (2013.01); *H01C 1/148* (2013.01); *H01C 7/008* (2013.01)

(58) Field of Classification Search
CPC .. G01K 1/12; G01K 7/02; G01K 7/08; G01K 7/22; H01C 1/148; H01C 7/008
See application file for complete search history.

(56) References Cited

U.S. PATENT DOCUMENTS 3,815,074 A * 6/1974 Nagata ................... H01C 17/28
29/613
7,470,999 B2 * 12/2008 Saito ....................... H01L 24/01
501/55
(Continued)

FOREIGN PATENT DOCUMENTS

DE     112011101480 B4   11/2018
EP         2326604 B9      3/2015
(Continued)

OTHER PUBLICATIONS

"Durmet: Wire \ Ribbon" from JLC Electromet < https://www.dumet.net/article/diode-grade-dumet-wire-data-sheet.html> copyright 2016.*

(Continued)

*Primary Examiner* — Randy W Gibson
(74) *Attorney, Agent, or Firm* — Slater Matsil, LLP

(57) ABSTRACT

In an embodiment a sensor arrangement includes a sensor element including a ceramic base body and at least two electrodes, wherein the electrodes are arranged on an outer side of the ceramic base body, at least two contacting elements configured for making electrical contact with the sensor element, the contacting elements being connected to the electrodes in a connection region and a glass sheath, wherein at least the ceramic base body and the connection region are completely enclosed in the glass sheath, wherein the glass sheath is pressure tensioned, and wherein a coefficients of expansion of the glass sheath, the contacting (Continued)

elements and the sensor element are adapted to one another for the pressure tensioning of the glass sheath.

23 Claims, 4 Drawing Sheets

(51) Int. Cl.
*G01K 7/22* (2006.01)
*H01C 1/148* (2006.01)
*H01C 7/00* (2006.01)

(56) References Cited

U.S. PATENT DOCUMENTS

| | | |
|---|---|---|
| 8,822,044 B2 | 9/2014 | Neuber et al. |
| 9,312,054 B2* | 4/2016 | Watanabe .............. H01C 17/02 |
| 9,714,869 B2 | 7/2017 | Satou et al. |
| 2002/0172258 A1* | 11/2002 | Adachi .................... H01C 1/14 |
| | | 374/185 |
| 2002/0175154 A1* | 11/2002 | Karube .............. G03G 15/2057 |
| | | 219/553 |
| 2013/0077653 A1* | 3/2013 | Koshimizu .............. G01K 7/22 |
| | | 374/185 |
| 2016/0033337 A1* | 2/2016 | Sato ........................ G01K 7/22 |
| | | 374/185 |
| 2018/0346370 A1* | 12/2018 | Kobayashi ............. H01C 1/028 |
| 2019/0187002 A1 | 6/2019 | Baba |
| 2022/0013816 A1* | 1/2022 | Nishide ............... H01M 50/287 |

FOREIGN PATENT DOCUMENTS

| | | |
|---|---|---|
| JP | S58141507 U | 9/1983 |
| JP | 2005294653 A | 10/2005 |

OTHER PUBLICATIONS

Computer translation of DE 11 2011 101480 downloaded from the EPO website, downloaded Nov. 8, 2024.*
"What is Sintering (A Definitive Guide)" from TWI-Global webpage <https://www.twi-global.com/technical-knowledge/faqs/what-is-sintering> downloaded Nov. 9, 2024.*
Feteira, A., "Negative Temperature Coefficient Resistance (NTCR) Ceramic Thermistors: An Industrial Perspective," Journal of the American Ceramic Society, vol. 92, No. 5, Jan. 15, 2009, 17 pages.

* cited by examiner

SENSOR ARRANGEMENT AND METHOD FOR PRODUCING A SENSOR ARRANGEMENT

This patent application is a national phase filing under section 371 of PCT/EP2021/078297, filed Oct. 13, 2021, which claims the priority of German patent application 102020126833.5, filed Oct. 13, 2020, each of which is incorporated herein by reference in its entirety.

TECHNICAL FIELD

The present invention relates to a sensor arrangement, in particular a sensor arrangement for measuring a temperature. The present invention further relates to a method for producing a sensor arrangement.

BACKGROUND

The constantly increasing demands on temperature sensors with regard to higher operating temperatures and, at the same time, particularly high reliability and low manufacturing costs require the use of new, coordinated material combinations and manufacturing technologies.

Previously available low-cost sensors with low noble metal content (Au, Pt) are limited in their operating temperature and can usually only be used up to 300° C. with glass encapsulation. Sensors for higher operating temperatures require the use of noble metals such as platinum. The use of FeNi wires with copper sheath, on the other hand, leads to wire corrosion at higher operating temperatures and thus to a limited service life of the sensors.

According to the state of the art, temperatures for monitoring and control in a wide variety of applications are measured primarily with ceramic thermistor elements ("negative temperature coefficient"/NTC thermistors).

To ensure sufficient mechanical stability and protection against external influences and to avoid corrosion by aggressive media, the sensor elements are coated with a polymer or glass.

For electrical contacting of the NTC ceramic, mechanical electrodes must be applied. According to the state of the art, mainly silver and gold pastes are applied via a screen printing process with subsequent firing. Silver metallization is mainly used for solder connections with leads and gold metallization for metallic sinter paste contacting. Gold metallization is used for sintering contacting pastes with lead wires.

However, the operating temperature of solder joints is limited by the melting temperature of the solders. High-lead solders have a melting temperature of about 300° C., and most lead-free solders already melt at temperatures below 230° C. Solder joints are not sufficiently reliable under frequent temperature cycling. Many solder materials also tend to migrate in damp or wet environments.

For higher operating temperatures of 250° C. to 300° C. or higher, contacting by means of sintering paste is common. In addition, much higher temperatures are required in the manufacturing process, since a glass encapsulation instead of a polymer encapsulation is necessary due to the operating temperature. However, this type of sensor element manufactured in this way is associated with high costs, since the electrode and the contacting paste are made of gold. In addition, the process costs are very high due to the paste application and drying as well as the subsequent firing of the paste.

Welding wires onto the electrode of the NTC ceramic, on the other hand, is not an alternative, since preliminary damage to the electrode or the ceramic occurs. The wires, which are solid in relation to the thickness of the electrode layer, require a very high energy input to melt the wire to make the connection. However, this in turn leads to a complete detachment of the electrode layer from the ceramic and the associated thermal shock can lead to cracks in the ceramic or have a negative effect on the electrical properties.

SUMMARY

Embodiments provide a sensor arrangement and a method for producing a sensor arrangement which solve the above problems.

According to one embodiment, a sensor arrangement is described. The sensor arrangement is adapted for measuring a temperature. The sensor arrangement is adapted for high operating temperatures. The sensor arrangement is a high temperature sensor arrangement. An application temperature of the sensor arrangement is preferably 300° C. and 650° C. Particularly preferably, the application temperature is between 450° C. and 650° C.

The sensor arrangement comprises a sensor element. Preferably, the sensor element comprises an NTC thermistor chip. The sensor element has a ceramic base body. Preferably, the ceramic base body has a ceramic material with a high long-term stability. In particular, the base body has as ceramic material a drift-stable perovskite ceramic according to the document EP 2 326 604 B9.

The sensor element further comprises at least two electrodes, preferably exactly two electrodes. The electrodes are arranged on an outer side of the ceramic base body, for example on opposite side surfaces of the base body. Preferably, the electrodes have a gold or silver thick-film metallization. Preferably, the gold or silver thick-film metallization is lead-free.

The sensor arrangement has at least two contacting elements, preferably exactly two contacting elements, for making electrical contact with the sensor element. Preferably, the contacting elements comprise wires. The contacting elements are mechanically and electrically conductively connected to the electrodes in a connection region. The electrodes and the contacting elements are connected to each other via a gold or silver contacting paste.

The contacting elements have a material which is particularly temperature-resistant and at the same time has a low corrosion tendency. The contacting elements also have no or only a low noble metal content. This makes it possible to provide a particularly cost-effective and temperature-resistant sensor arrangement. Preferably, the contacting elements have a nickel-iron alloy or silver with small amounts of nickel. Particularly preferably, the contacting elements consist of nickel-iron alloy or silver with small amounts of nickel.

Additionally, the contacting elements may have a protective layer to further inhibit corrosion. The protective layer is formed on an outer surface of the respective contacting element. Preferably, the protective layer completely covers the outer side of the respective contacting element. The protective layer may comprise Ni, Cu or Ag. In particular, contacting elements coated with Ag exhibit high long-term stability at temperatures up to over 650° C.

The sensor arrangement has a glass sheath. The glass sheath is applied over the sensor element and the connection region. Preferably, the sensor element and the connection region are completely embedded in the glass sheath.

The glass sheath can be applied by dip coating in a paste in which glass powder is dispersed or by melting a cylindrical glass preform. The glass sheath serves to protect and mechanically stabilize the sensor element and the connection region.

The glass sheath is pressure tensioned. The expansion coefficients of the glass sheath, the contacting elements and the sensor element are adapted to each other for pressure tensioning of the glass sheath. Preferably, the coefficient of expansion is greater in an inner region of the sensor arrangement than in an outer region of the sensor arrangement. In other words, the glass sheath has a smaller coefficient of expansion than the ceramic base body and the contacting elements. This leads to a tensile stress inside the sensor arrangement, which exerts a compressive stress on the surface of the glass sheath.

The compressive stress on the glass sheath results in an increase in the mechanical strength of the glass sheath and consequently of the sensor arrangement. This provides a particularly stable and durable sensor arrangement. In particular, the sensor arrangement is especially durable and stable over long periods of time at high operating temperatures, preferably temperatures of up to 650° C.

According to an embodiment, the glass sheath has a material the melting temperature of which is below the melting temperature of a material of the electrodes. Thus, melting of the electrodes and the connection region can be avoided during the glazing process. This ensures that fabrication is possible without damaging the electrode.

The glass sheath further preferably has a material whose softening temperature $T_g$ is above an application temperature of the sensor arrangement. This allows a high application temperature to be achieved, preferably an application temperature of up to 650° C.

Preferably, the glass sheath comprises a recrystallizing glass. Particularly preferably, the glass sheath comprises a recrystallizing barium zinc silicate glass. Thus, a sensor arrangement with a design is disclosed which, with a suitable material combination using wires with no or only a small noble metal content, enables a corrosion- and migration-resistant sensor for higher operating temperatures.

According to one embodiment, the sensor arrangement further comprises a ceramic cap. The ceramic cap may, for example, comprise aluminum oxide. Preferably, the ceramic cap has a coefficient of expansion that is slightly greater than the coefficient of expansion of the glass sheath. Preferably, the difference in the coefficients of expansion of the ceramic cap and the glass sheath is less than 1 ppm.

Preferably, the sensor element and the connection region are completely introduced in the ceramic cap. Furthermore, the contacting elements as well as the glass sheath are at least partially introduced in the ceramic cap. The ceramic cap is at least partially fused to the glass sheath. The ceramic cap increases the long-term stability of the sensor arrangement at high operating temperatures.

According to a further embodiment, a method for producing a sensor arrangement is described. Preferably, the method produces the sensor arrangement described above. All features disclosed with respect to the sensor arrangement or the method are also disclosed correspondingly with respect to the respective other embodiment and vice versa, even if the respective feature is not explicitly mentioned in the context of the respective embodiment. The method comprises the following steps:

A) Providing a sensor element comprising a ceramic base body and at least two electrodes. Preferably, the electrodes comprise a lead-free gold or silver thick-film metallization. Preferably, the sensor element comprises an NTC thermistor chip.

B) Providing at least two contacting elements, preferably two wires. Preferably, the contacting elements consist of nickel-iron alloy or silver with small amounts of nickel. Furthermore, protective layers comprising Ni, Cu or Ag can be applied to the contacting elements.

Partial immersion of the contacting elements in a contacting paste. Preferably, the contacting paste comprises silver or gold. An area of the contacting elements immersed in the contacting paste (sheath area) is smaller than an edge length of the ceramic base body. In other words, the contacting elements are not connected to the electrodes over the entire edge length of the ceramic base body.

C) Pressing the contacting elements onto the electrodes in a connection region. The connection region is smaller than the edge length of the ceramic base body.

D) Sintering. Thereby, the prepared sensor is placed in a furnace and subjected to a thermal profile. This can be a batch furnace or a continuous furnace.

E) Partial immersion of the sintered system (base body, electrodes, contacting elements) at a defined speed in a glass paste (dip coating with glass paste). In particular, the sintered system is dipped into the glass paste in such a way that the sensor element (base body, electrodes) and at least the connection region are completely enclosed with glass paste to achieve a complete glass sheath. The glass paste preferably comprises recrystallizing barium zinc silicate glass.

F) Defined lateral movement of the sintered system in the glass paste and subsequent extraction of the sintered system from the glass paste at a defined speed. This procedure is used to achieve a glass sheath as free of bubbles and defects as possible.

G) Drying. Preferably, this step comprises pre-drying at room temperature and subsequent drying in the furnace at elevated temperature. The drying must be sufficiently careful to ensure a bubble- and defect-free glass sheath and to allow the additives necessary for the production of the glass paste to escape.

H) Glazing. Thereby, the glass sheath is heated to a temperature above a glass softening temperature $T_g$ and then melted.

The process results in a robust and long-term stable high-temperature sensor arrangement with hermetically sealed glass encapsulation. In order to realize the compressive stress of the sensor head (sensor element with connection region), it is particularly important not only to select suitable materials (expansion coefficients) but also to maintain an adapted temperature profile in the furnace. Suitable batch or continuous furnaces can be used for both the drying and the glass melting process.

According to a further embodiment, a method for producing a sensor arrangement is described. Preferably, the method produces the sensor arrangement described above. All features disclosed with respect to the sensor arrangement or the method are also correspondingly disclosed with respect to the respective other embodiment and vice versa, even if the respective feature is not explicitly mentioned in the context of the respective embodiment. The method comprises the following steps:

A) Providing a sensor element comprising a ceramic base body and at least two electrodes. Preferably, the electrodes comprise a lead-free gold or silver thick-film metallization. Preferably, the sensor element comprises an NTC thermistor chip.

B) Providing at least two contacting elements, preferably two wires. Preferably, the contacting elements consist of nickel-iron alloy or silver with small amounts of nickel. Furthermore, protective layers comprising Ni, Cu or Ag can be applied to the contacting elements.

Partial immersion of the contacting elements in a contacting paste. Preferably, the contacting paste comprises silver or gold. An area of the contacting elements immersed in the contacting paste (sheath area) is smaller than an edge length of the ceramic base body. In other words, the contacting elements are not connected to the electrodes over the entire edge length of the ceramic base body.

C) Pressing the contacting elements onto the electrodes in a connection region. The connection region is smaller than the edge length of the ceramic base body.

D) Sintering. Thereby, the prepared sensor is placed in a furnace and subjected to a thermal profile. This can be a batch furnace or a continuous furnace.

E) Placing a glass preform, preferably a pressed glass tube, onto the sintered system. The glass preform is placed on the sintered system in such a way that the sensor element and at least the connection region are fully inserted into the glass preform. In particular, the glass preform is positioned in such a way that the sensor head with the ceramic base body and connection region is covered by the glass preform. The glass preform preferably comprises a recrystallizing barium zinc silicate glass.

F) Melting of the glass preform to form a glass sheath. The temperature profile in the furnace includes several steps. In order to carefully evaporate organic additives, a certain holding time is provided at a lower temperature before the actual melting of the glass takes place at a subsequently higher temperature. Melting takes place by heating the glass preform to a temperature above a glass softening temperature $T_g$.

Also in this method, in addition to the selection of suitable materials, it is particularly important to maintain an appropriate temperature profile in the furnace in order to realize the compressive stress of the sensor head. Suitable batch or continuous furnaces can be used for both the drying and the glass melting process.

According to a further embodiment, a method for producing a sensor arrangement is described. Preferably, by the method the sensor arrangement described above is produced. All features disclosed with respect to the sensor arrangement or the method are also disclosed correspondingly with respect to the respective other embodiment and vice versa, even if the respective feature is not explicitly mentioned in the context of the respective embodiment. The method comprises the following steps:

A) Providing a sensor element comprising a ceramic base body and at least two electrodes. Preferably, the electrodes comprise a lead-free gold or silver thick-film metallization. Preferably, the sensor element comprises an NTC thermistor chip.

B) Providing at least two contacting elements, preferably two wires. Preferably, the contacting elements consist of nickel-iron alloy or silver with small amounts of nickel. Furthermore, protective layers comprising Ni, Cu or Ag can be applied to the contacting elements.

Partial immersion of the contacting elements in a contacting paste. Preferably, the contacting paste comprises silver or gold. An area of the contacting elements immersed in the contacting paste (sheath area) is smaller than an edge length of the ceramic base body. In other words, the contacting elements are not connected to the electrodes over the entire edge length of the ceramic base body.

C) Pressing the contacting elements onto the electrodes in a connection region. The connection region is smaller than the edge length of the ceramic base body.

D) Sintering. Thereby, the prepared sensor is placed in a furnace and subjected to a thermal profile. This can be a batch furnace or a continuous furnace.

E) Providing a ceramic cap. The ceramic cap preferably comprises aluminum oxide. The ceramic cap has an inner region for receiving the sintered system. The ceramic cap further comprises at least two feedthroughs for receiving the contacting elements.

Partial insertion of the sintered system into the ceramic cap. Preferably, in this step the contacting elements are guided from a first side (top side) of the ceramic cap through the interior of the ceramic cap and inserted into the recesses so that the contacting elements protrude at least partly from a second side (bottom side) of the ceramic cap.

F) Partial filling of the ceramic cap with a glass paste at a defined speed. The glass paste preferably comprises recrystallizing Ba, Zn or silicate glass. Preferably, the inner region of the ceramic cap is filled up to one third with glass paste. This can be followed by a defined lateral movement of the ceramic cap at a predetermined speed for uniform distribution of the glass paste in the interior of the ceramic cap.

G) Further introduction of the sintered system into the partially glass paste-filled ceramic cap at a defined speed. The sintered system is introduced in such a way that the sensor element and the connection region are completely arranged in the ceramic cap.

H) Defined lateral movement at a predetermined speed to wet the sensor element and the connection region with the glass paste.

I) Further filling of the ceramic cap with the glass paste. In particular, the ceramic cap is filled with the glass paste in such a way that the sensor element and at least the connection region are completely enclosed by the glass paste to form a glass sheath.

J) Drying. Preferably, this step comprises pre-drying at room temperature followed by drying in the furnace at an elevated temperature. The drying must be sufficiently careful to ensure a bubble- and defect-free glass sheath and to allow the additives necessary for the production of the glass paste to escape.

K) Glazing by heating the glass sheath to a temperature above a glass softening temperature $T_g$ and melting the glass sheath.

The process described above achieves a hermetically sealed glass sheath. The resulting sensor arrangement is particularly corrosion-resistant and stable over long periods at high temperatures.

BRIEF DESCRIPTION OF THE DRAWINGS

The drawings described below are not to be regarded as true to scale. Rather, individual dimensions may be enlarged, reduced or even distorted for better representation.

Elements that are similar to each other or that perform the same function are designated with the same reference signs.

DETAILED DESCRIPTION OF ILLUSTRATIVE EMBODIMENTS

Figure 1:
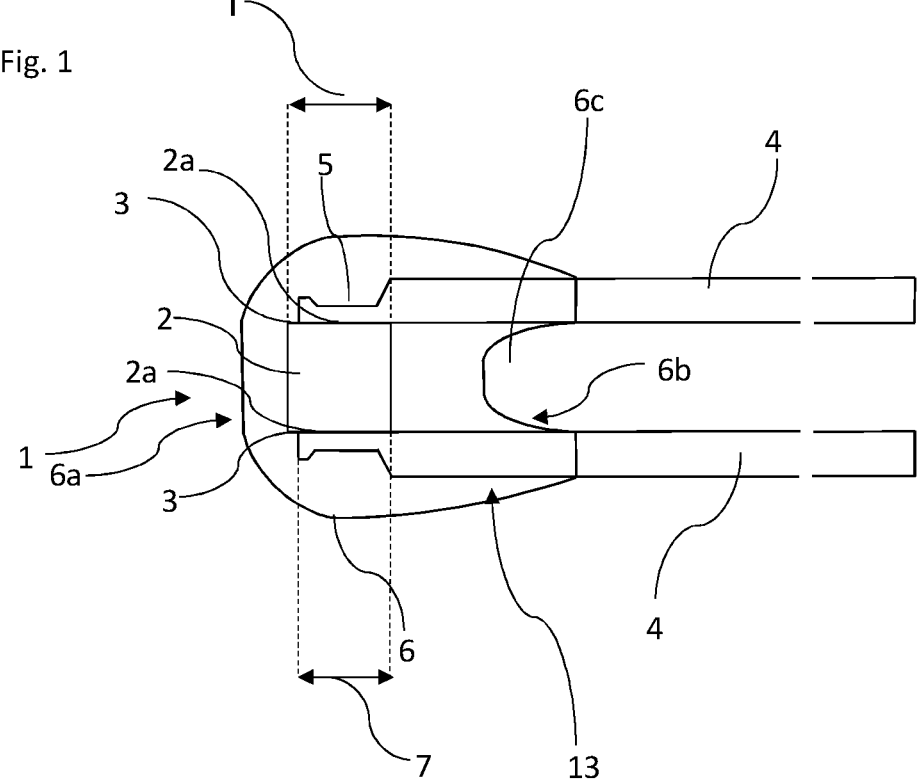
FIG. 1 shows a sectional view of a sensor arrangement according to a first embodiment.

FIG. 1 shows a first embodiment of a sensor arrangement 1, which is adapted to measure a temperature. The sensor arrangement 1 is adapted for use at high temperatures. An application temperature of the sensor arrangement 1 is ≥300° C. and ≥650° C. The sensor arrangement 1 is a high-temperature sensor arrangement.

The sensor arrangement 1 has a sensor element or a sensor chip. The sensor element is preferably an NTC thermistor chip. The sensor element has a ceramic base body 2. The ceramic base body 2 has a ceramic material with a high long-term stability. The ceramic material comprises a drift-stable perovskite ceramic according to the document EP 2 326 604 B9. In particular, the ceramic base body 2 comprises a ceramic material of the general formula $[SE_{1-x}M''_x][Cr_{1-y-z}R_yL_z]O_3$, where SE stands for one or more rare earth metals, $M''$ stands for one or more metals of oxidation state +II, L stands for Al and/or Ga, R stands for one or more metals selected from Fe, Zn, Ge, Sn, and it holds: $0<x<1$; $0<y<1$; $0.5<z<1$; $y+z<1$; $0.1<1-y-z<0.2$.

Figure 3:
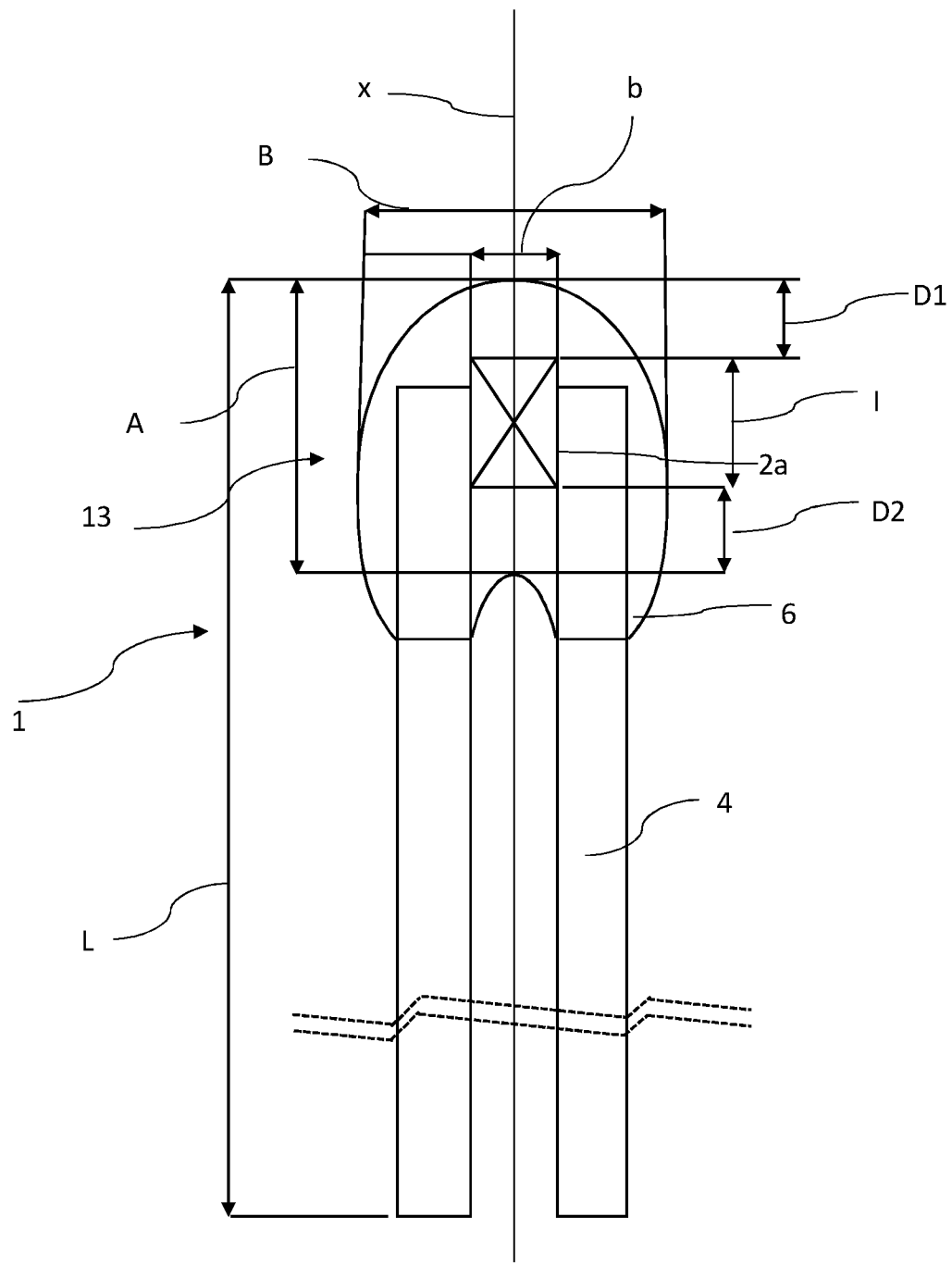
FIG. 3 shows a sectional view of the sensor arrangement according to FIG. 1.

The ceramic base body 2 has side surfaces 2a (see also FIG. 3). The side faces 2a are arranged opposite each other. Each side surface has an edge length l (FIG. 3). The edge length l is <2 mm, preferably <1 mm. The ceramic base body 2 has a width b (FIG. 3). The width b is <1 mm, preferably <0.5 mm. The sensor element or the ceramic base body 2 preferably has a dimension<1 mm×<1 mm×0.500 mm. The sensor arrangement 1 has an overall length L (extension along a longitudinal axis X), as can be seen in FIG. 3.

The sensor element further comprises two electrodes 3. The electrodes 3 are formed on an outer surface of the sensor element. In particular, the electrodes 3 are formed on the opposite side surfaces 2a of the ceramic base body 2. The electrodes 3 comprise a gold or silver thick-film metallization. The gold or silver thick-film metallization is lead-free.

The sensor arrangement 1 has two contacting elements 4 for electrical contacting of the sensor element. In this embodiment, the contacting elements 4 have wires. However, other contacting elements 4 are also conceivable.

The contacting elements 4 have a corrosion-resistant composition. For example, the contacting elements 4 have an iron-nickel alloy or silver with small amounts of nickel. In this embodiment, the contacting elements 4 comprise NiFe.

The contacting elements 4 further comprise a protective layer (not explicitly shown) for further inhibiting corrosion. The protective layer may comprise Ni, Cu or Ag. The respective contacting element 4 preferably has a diameter between 0.1 mm and 0.5 mm, preferably between 0.2 mm and 0.3 mm.

The contacting elements 4 are electrically and mechanically connected to the electrodes 3 in a connection region 7. The electrodes 3 and the contacting elements 4 are connected to each other via a gold or silver contacting paste 5. The contacting elements 4 are sintered to the electrodes 3.

The connection region 7 is smaller than the edge length l of the respective side surface 2a. In other words, the contacting elements 4 cover only a partial area of the electrodes 3 or the side surfaces 2a. The contacting elements 4 may be flattened in the connection region 7 to increase a cross-sectional area of the respective contacting element 4.

The sensor arrangement 1 further comprises a glass sheath 6. In this embodiment, the glass sheath 6 completely encloses the ceramic base body 2 or the sensor element as well as the connection region 7. In particular, the glass sheath 6 encloses a head of the sensor arrangement 1 (sensor head 13, see also FIG. 3) completely. In this case, the sensor head 13 comprises the sensor element as well as at least a partial area of the contacting elements 4, as can be seen in FIG. 3.

A width B (extension perpendicular to the longitudinal axis X) of the sensor head 13 including the glass sheath 6 is 0.7 mm to 2.5 mm (FIG. 3). A minimum longitudinal extension A (extension along the longitudinal axis X) of the glass sheath 6 is in the range of 0.5 to 2.5 mm, as can be seen in FIG. 3. Thereby, an indentation 6c of the glass sheath 6 can occur at a bottom side 6b of the glass sheath 6, as can be seen in FIG. 3.

An upper distance D1 between a top side of the ceramic base body 2 and an top side 6a of the glass sheath 6 is preferably at least 0.1 mm. A lower distance D2 between the bottom side of the ceramic base body 2 and a bottom side 6b of the glass sheath 6 is also preferably at least 0.1 mm (FIG. 3).

The glass sheath 6 forms an outer shell of the sensor head 13. The glass sheath 6 is adapted to protect and mechanically stabilize the sensor arrangement 1. The glass sheath 6 has a material whose melting temperature is below the melting temperature of the electrode material. Preferably, the melting temperature of the glass sheath 6 is between 700° C. and 900° C. Furthermore, the material of the glass sheath has a softening temperature $T_g$ above the application temperature of the sensor arrangement 1. Preferably, the softening temperature $T_g$ is at least 25° C. above the application temperature.

The glass sheath 6 comprises a recrystallizing glass. In particular, the glass sheath 6 comprises a recrystallizing barium zinc silicate glass. The glass sheath 6 of the sensor head 13 comprises a compressive stress in the outer sheath. The coefficients of expansion of the contacting elements 4 and the ceramic base body 2 of the sensor element are adapted to each other to achieve a compressive stress of the glass sheath 6.

Preferably, the glass sheath 6 has a smaller coefficient of expansion α than the contacting elements 4 and the ceramic base body 2. In other words, the sensor arrangement 1 has a higher coefficient of expansion in an inner region than in an outer region. Preferably, the contacting elements 4 have a coefficient of expansion α, where $7[10^{-6} K^{-1}] \leq \alpha \leq 12[10^{-6} K^{-1}]$. In the embodiment, in which the contacting elements have silver with a small amount of nickel, the coefficient of expansion α of the contacting elements 4 is about $19[10^{-6} K^{-1}]$.

The coefficient of expansion of the ceramic base body 2 is preferably $6.5[10^{-6} K^{-1}] \leq \alpha \leq 8.5[10^{-6} K^{-1}]$. Preferably, the coefficient of expansion of the glass sheath is $<7[10^{-6} K^{-1}]$, for example $6.9[10^{-6} K^{-1}]$.

Since there is a higher coefficient of expansion in the interior of the sensor arrangement 1 than in the exterior, the sensor element and the contacting elements 4 in the interior exert a tensile stress on the glass sheath 6. This tensile stress in the interior acts on the surface of the glass sheath 6 as compressive stress. The compressive stress of the glass sheath 6 leads to a higher strength or to a harder surface of the glass sheath and thus to a modified fracture behavior of the glass sheath 6. Higher mechanical loads on a surface of the glass sheath 6 therefore do not necessarily trigger fracture due to the compressive stress. This enables a very robust design that is stable over the long term for high operating temperatures of up to 650° C.

The sensor arrangement 1 according to FIG. 1 is produced by two possible manufacturing processes (variant 1: dip coating; variant 2: glass preform), which are, however, identical in some process steps.

In the following, the manufacture of the sensor arrangement by means of variant 1 (dip coating) is described first:

In a first step A), the sensor element with the ceramic base body 2 and the at least two electrodes 3 is provided. The drift-stable ceramic base body 2 with the gold or silver thick-film metallization as electrodes 3 is then clamped in a high-precision fixture.

In a next step B) the two contacting elements 4 are provided. The contacting elements 4 are then partially immersed in the contacting paste 5. In particular, the contacting elements 4 are immersed in a gold or silver contacting paste, depending on the type of electrodes 3 of the ceramic base body 2, where the lateral surface of the respective contacting element 4 wetted with paste 5 must be smaller than the edge length l of the sensor element or of the ceramic base body 2.

In a next step C), the contacting elements 4 are pressed onto the electrodes in the connection region 7. In other words, the end areas of the contacting elements 4 coated with contacting paste 5 are pressed against the sensor element in the fixture by means of mechanical pretension.

In a further step D), heat treatment (sintering) takes place. Thereby, the fixture is placed in a furnace and subjected to a thermal profile. This can be a batch furnace or a continuous furnace.

After sintering, the next step E) is dip coating with glass paste 12 (variant 1). The glass paste 12 is first provided. The glass powder is dispersed in the glass paste 12. The glass powder comprises a recrystallizing barium zinc silicate glass. The expansion coefficients of the glass powder, contacting elements 4 and base body 2 are adapted to one another as described above.

The sintered system is partially immersed at a defined speed in a reservoir filled with a glass paste 12, so that the sensor element and at least the connection region 7 are completely enclosed with the glass paste 12 to form the glass sheath 6. In particular, the sensor head 13 must be completely enclosed by the glass paste 12.

To ensure bubble-free encapsulation of the sensor head 13, a slight defined lateral movement of the sintered system in the glass paste 12 is carried out in step F). Lateral movement in this case means a movement perpendicular to the longitudinal axis X of the sensor arrangement 1. Subsequently, the sintered system is pulled out of the glass paste 12 at a defined speed.

This is followed by a drying step G). The drying must take place with sufficient care to ensure a bubble- and defect-free glass sheath 6 and to allow the additives necessary for the production of the glass paste 12 to escape. For example, the glass paste 12 is first dried for 4 hours at room temperature. Subsequently, the glass paste 12 can be dried at 50° C. for a further 30 minutes.

In the subsequent glazing step H), the glass sheath 6 is brought to temperatures above the glass softening point by means of a defined profile and melted. In this way, a hermetically sealed glass sheath 6 is achieved.

In order to achieve the above-described compressive stress of the sensor head 13, it is particularly important not only to select suitable materials but also to maintain an appropriate temperature profile in the furnace. During both the drying and the glass melting process suitable batch or continuous furnaces can be used.

In the following, the production of the sensor arrangement 1 according to FIG. 1 by means of variant 2 (glass preform) is described:

First, steps A) to D) already described above are carried out. In other words, steps A) to D) of the manufacture according to variant 2 are identical to the steps A) to D) of the above-described manufacture according to variant 1.

Figure 2:
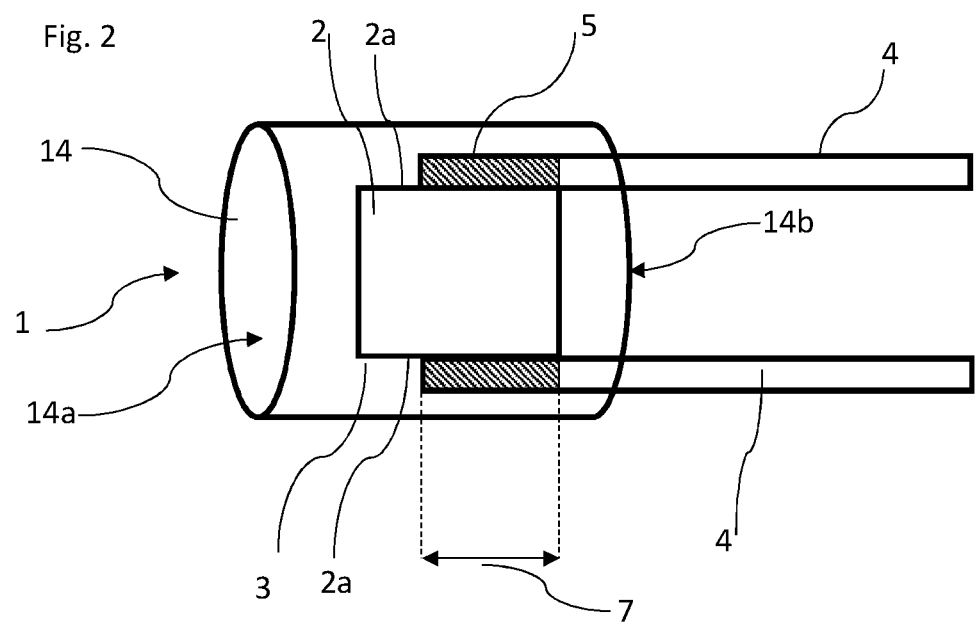
FIG. 2 shows a sectional view of an intermediate stage in the production of the sensor arrangement according to FIG. 1.

After the sintering step, in step E) a glass preform 14 (cylindrical glass tube) is placed on the sintered system. The sintered system is positioned in such a way that the sensor head 13 with sensor element and connection region 7 is covered by the glass preform 14, i.e. is arranged completely in an inner region of the glass preform 14, as can be seen in FIG. 2.

The glass preform 14 has a cylindrical shape. The glass preform 14 is pre-sintered. The glass preform 14 is open at the top and bottom (open top side 14a and open bottom side 14b). The sensor element and at least the connection region 7 are completely inserted into the cylindrical glass preform 14. In particular, the sensor element and the connection region 7 are arranged completely in an inner region of the glass preform 14. The contacting elements 4 protrude at least partly from the bottom side 14b of the glass preform 14, as can be seen in FIG. 2.

Subsequently, in step F), the glass preform 14 is melted in the furnace to form the glass sheath 6 (see FIG. 1). Melting is performed by heating the glass preform 14 to a temperature above the glass softening temperature $T_g$.

The temperature profile in the furnace includes several steps. In order to carefully evaporate the organic additives that may be contained in a pressed preform 14, a certain holding time is provided at a lower temperature before the actual melting of the glass takes place at a subsequently higher temperature.

In order to realize the compressive stress of the sensor head 13, it is also particularly important to maintain an adapted temperature profile in the furnace, in addition to the selection of suitable materials. Suitable batch or continuous furnaces can be used for both the drying and the glass melting process.

Figure 4:
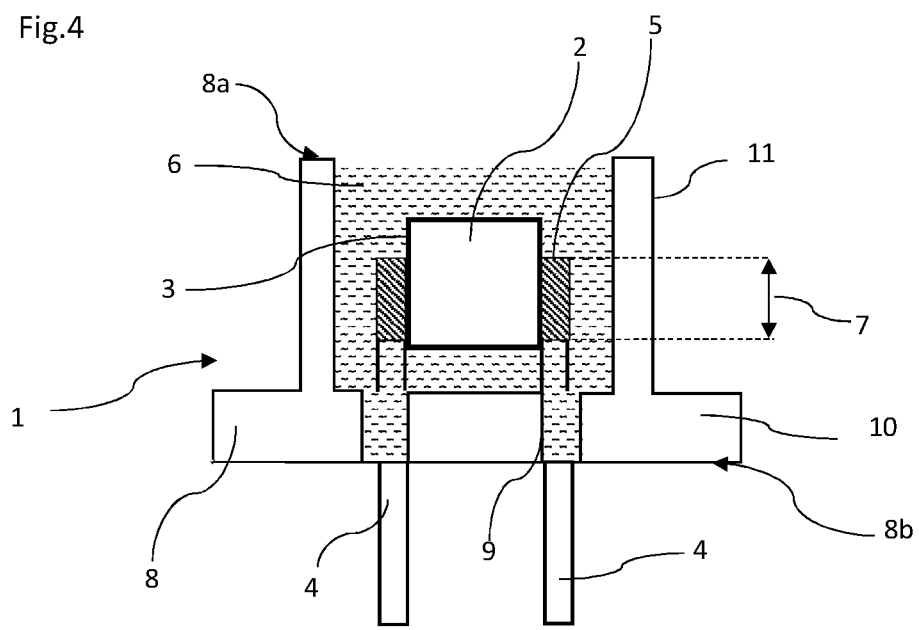
FIG. 4 shows a sectional view of a sensor arrangement according to a further embodiment.

FIG. 4 shows a sensor arrangement 1 according to a second embodiment. The sensor arrangement according to 1 FIG. 4 differs from the above-described sensor arrangement 1 according to FIG. 1 essentially by the shape and manufacture of the glass sheath 6 or the presence of a ceramic cap 8. With regard to the features of the further components (sensor element with ceramic base body 2 and electrodes 3, contacting elements 4) as well as the composition of the glass sheath 6, reference is made to the description in connection with FIG. 1.

The sensor arrangement 1 according to FIG. 4 has a ceramic cap 8. The ceramic cap 8 may, for example, comprise aluminum oxide. The ceramic cap 8 has a coefficient of expansion which is slightly higher than the coefficient of expansion of the glass sheath 6. Preferably, the difference between the coefficients of expansion of ceramic cap 8 and glass sheath 6 is less than $1[10^{-6}\ K^{-1}]$.

The sensor element and the connection region 7 are completely introduced in the ceramic cap 8. Furthermore, the contacting elements 4 and the glass sheath 6 are at least partially introduced in the ceramic cap 8. The ceramic cap 8 is at least partially fused to the glass sheath 6. The ceramic cap 8 increases the long-term stability of the sensor arrangement 1 at high operating temperatures.

The ceramic cap 8 has a sleeve-shaped upper part 11 and a plate-shaped lower part 10. The ceramic cap 8 has an open end (top side 8a) and a closed end (bottom side 8b). The closed end is closed with the lower part 10. The upper part 11 and lower part 10 are formed in one piece. The lower part 10 has two recesses or feedthroughs 9. The ceramic cap 8 preferably comprises aluminum oxide.

The sensor arrangement 1 according to FIG. 4 is manufactured by two possible manufacturing processes (variant 1: glass preform; variant 2: glass paste), which are, however, identical in some process steps.

In the following, the manufacture of the sensor arrangement with variant 1 (glass preform) is first described, which is illustrated with the aid of FIGS. 5a to 5c:

In steps A) to) D), the sensor element is provided and the contacting elements 4 are connected. Steps A) to D) are carried out analogously to the above-described methods for producing the sensor arrangement according to FIG. 1.

In a further step E) the ceramic cap 8 described above is provided (FIG. 5a).

In a next step F) a glass preform 14 is provided. The glass preform 14 comprises a recrystallizing barium zinc silicate glass. The glass preform 14 has a cylindrical shape. The glass preform 14 is pre-sintered. The glass preform 14 is open at the top and bottom (open top 14a and open bottom side 14b, FIG. 2). The glass preform 14 has an outer diameter which is slightly smaller than an inner diameter of the ceramic cap 8.

Figure 5A:
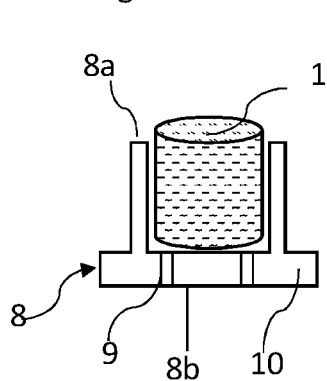
FIGS. 5a to 5c show a method for producing the sensor arrangement according to FIG. 4.

The glass preform 14 is inserted into the ceramic cap 8 from the open end 8a of the ceramic cap 8 (FIG. 5a). The glass preform 14 is inserted into the ceramic cap 8 in such a way that the glass preform 18 rests on the lower part 10 of the ceramic cap 8. The glass preform 14 has a height such that it partially protrudes from the open end 8a of the ceramic cap 8.

In a further step G), the sensor element and at least the connection region 7 are completely inserted into the cylindrical glass preform 14. In particular, the sensor element and the connection region 7 are arranged completely in an inner region of the glass preform 14.

Figure 5B:
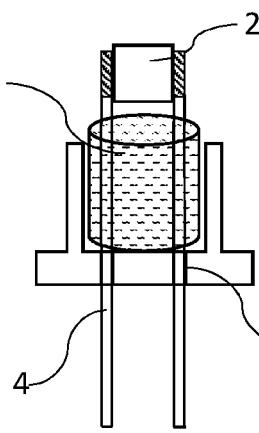

Thereby, first, the contacting elements 4 are inserted from the open top side 8a of the ceramic cap 8 into the feedthroughs 9 of the ceramic cap 8 (FIG. 5b). The contacting elements 4 protrude at least partially from the bottom side 14b of the glass preform 14 and from the bottom side 8b of the ceramic cap 8, as can be seen in FIG. 5b.

Figure 5C:
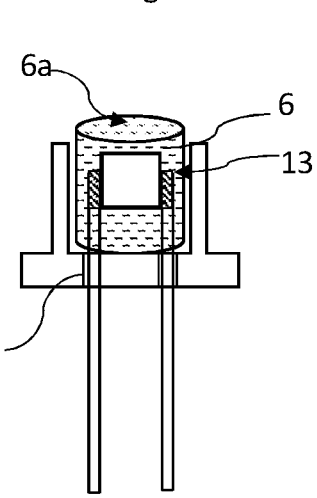

Afterwards, the sensor device 1 is completely inserted into the sleeve-shaped upper part 11, so that the sensor element and the connection region 7 are completely arranged in the glass preform 14 (FIG. 5c).

In a further step H), the arrangement is subjected to a heat treatment to form the glass sheath 6. Thereby, the glass preform 14 is melted down and, in this connection, the ceramic cap 8 is at least partially fused to the glass preform 14. Melting is carried out by heating the glass preform 14 to a temperature above the glass softening temperature $T_g$. Thereby, glass material penetrates at least partially into the feedthroughs 9 of the ceramic cap 8 and completely closes a possible annular gap between feedthrough 9 and contacting element 4 (FIG. 4).

The temperature profile in the furnace includes several steps. In order to carefully evaporate the organic additives which may be contained in a pressed preform 14, a certain holding time is provided at a lower temperature before the actual melting of the glass takes place at a subsequently higher temperature.

Due to the melting process, the glass material ideally settles in the ceramic cap 8 and wets its inner walls. As a result of the heat treatment, part of the volume of the glass material shrinks, so that the glass sheath 6 is completely arranged in the ceramic cap 8 after the heat treatment (FIG. 4).

The ceramic cap 8 further increases the robustness of the sensor arrangement 1.

In the following, the production of the sensor arrangement according to FIG. 4 with variant 2 (glass paste) is described, as can be seen in FIGS. 6a to 6e:

In steps A) to) D), the sensor element is provided and the contacting elements 4 are connected. Steps A) to D) are carried out analogously to the methods described above.

Figure 6A:
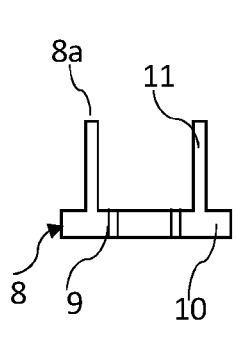
FIGS. 6a to 6e show an alternative method for producing the sensor arrangement according to FIG. 4.
Figure 6B:
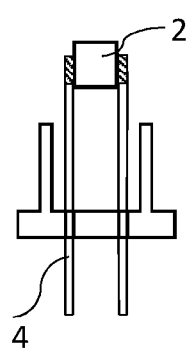

In step E) a ceramic cap 8 is provided (FIG. 6a). The sintered system is partially introduced into the ceramic cap 8 from the top side 8a of the ceramic cap 8. As can be seen in FIG. 6b, the contacting elements 4 are first inserted into the feedthroughs 9 and the sintered system is pushed towards the lower part 10 of the ceramic cap 8.

Figure 6C:
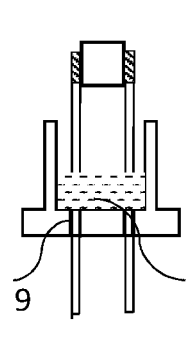

In a step F), the ceramic cap 8 is partially filled with a glass paste 12 at a defined speed. For example, the sleeve-shaped upper part 11 of the ceramic cap 8 is filled up to one third with the glass paste 12 (FIG. 6c). The glass paste 12 comprises a recrystallizing barium zinc silicate glass.

Subsequently, the ceramic cap 8 can be moved slightly laterally at a defined speed in order to distribute the glass paste 12 evenly in the ceramic cap 8.

Figure 6D:
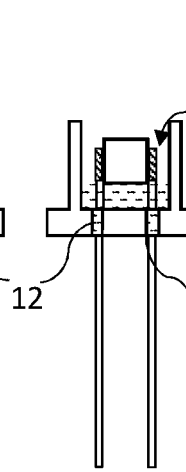
Figure 6E:
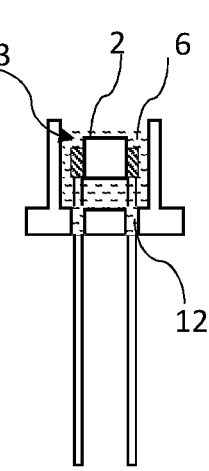

In a step G), the sintered system is further introduced into the ceramic cap 8 at a defined speed. Thereby, glass paste 12 penetrates at least partially into the feedthroughs 9 of the ceramic cap 8 and completely closes a possible annular gap between the feedthrough 9 and the contacting element 4 (FIGS. 6d, 6e, 4). In a final position, the sensor element and the connection region 7 are completely arranged inside the ceramic cap 8 (FIG. 6d).

In a step H), a defined lateral movement is performed at a defined speed to wet the sensor element and the connection region 7 with the glass paste 12 and to avoid bubble formation in the glass paste 12.

Subsequently, in a step I), the ceramic cap 8 is completely filled with the glass paste 12 so that the sensor element and at least the connection region 7 are completely enclosed by the glass paste 12 (FIG. 6e). The complete filling is carried out at a defined speed.

In a step J) the glass paste 12 is dried. The drying must take place with sufficient care to ensure a bubble- and defect-free glass sheath 6. Furthermore, the additives necessary for the production of the glass paste 12 must be able to escape. For example, the glass paste 12 is first dried at room temperature for 4 hours. Subsequently, the glass paste 12 may be dried at 50° C. for an additional 30 minutes.

Finally, a glazing step K) is carried out. In this step, the glass sheath 6 is brought to a temperature above the glass softening temperature $T_g$, so that the glass sheath 6 partially fuses with the ceramic cap 8.

The process described achieves a hermetically sealed, pressure tensioned glass sheath 6. The resulting sensor arrangement 1 is particularly robust, corrosion-resistant as well as stable over long periods under high temperatures.

The description of the objects disclosed herein is not limited to the individual specific embodiments. Rather, the features of the individual embodiments can be combined with each other as desired—as far as technically reasonable—.

The invention claimed is:

1. A sensor arrangement comprising:
a sensor element comprising a ceramic base body and at least two electrodes, wherein the electrodes are arranged on an outer side of the ceramic base body;
at least two contacting elements configured for making electrical contact with the sensor element, the contacting elements being connected to the electrodes in a connection region;
a ceramic cap; and
a glass sheath,
wherein at least the ceramic base body and the connection region are completely enclosed in the glass sheath,
wherein the glass sheath is pressure tensioned,
wherein coefficients of expansion of the glass sheath, the contacting elements and the sensor element are adapted to one another for the pressure tensioning of the glass sheath,
wherein the sensor arrangement is configured to measure a temperature,
wherein the glass sheath has a smaller coefficient of expansion than the ceramic base body and the contacting elements, and
wherein the ceramic cap is at least partially fused to the glass sheath.

2. The sensor arrangement according to claim 1, wherein the electrodes have a lead-free gold or silver thick-film metallization.

3. The sensor arrangement according to claim 1, wherein the contacting elements have a nickel-iron alloy or silver with small amounts of nickel.

4. The sensor arrangement according to claim 1, wherein the contacting elements have a protective layer, and wherein the protective layer comprises Ni, Cu or Ag.

5. The sensor arrangement according to claim 1, wherein the glass sheath comprises a recrystallizing barium zinc silicate glass.

6. The sensor arrangement according to claim 1, wherein the glass sheath comprises a material with a melting temperature below a melting temperature of a material of the electrodes.

7. The sensor arrangement according to claim 1, wherein the glass sheath comprises a material with a softening temperature above an application temperature of the sensor arrangement.

8. The sensor arrangement according to claim 1, wherein the sensor arrangement is configured to operate at a high application temperature which is ≥300° C. and ≤650° C.

9. A method for producing a sensor arrangement, the method comprising:
providing a sensor element comprising a ceramic base body and at least two electrodes;
providing at least two contacting elements and partially immersing the contacting elements in a contacting paste;
pressing the contacting elements onto the electrodes in a connection region;
sintering thereby forming a sintered system;
partially immersing the sintered system at a defined speed in a glass paste so that the sensor element and at least the connection region are completely enclosed in the glass paste to form a glass sheath;
laterally moving the sintered system in the glass paste and subsequently extracting the sintered system from the glass paste at a defined speed;
drying; and
glazing.

10. The method according to claim 9, wherein drying comprises first drying at room temperature and subsequently drying at elevated temperature in a furnace.

11. The method according to claim 9, wherein glazing comprises heating the glass sheath to a temperature above a glass softening temperature and melting the glass sheath.

12. The method according to claim 9, wherein the glass sheath comprises a recrystallizing barium zinc silicate glass.

13. The method according to claim 9, wherein an area of the contacting elements immersed in the contacting paste is smaller than an edge length of the ceramic base body.

14. The method according to claim 9, wherein the electrodes have a lead-free gold or silver thick-film metallization.

15. The method according to claim 9, wherein the contacting elements comprise a nickel-iron alloy or silver with small amounts of nickel, and/or wherein the contacting elements comprise a protective layer, the protective layer comprising Ni, Cu or Ag.

16. A method for producing the sensor arrangement of claim 1, the method comprising:
providing the sensor element;
providing the at least two contacting elements and partially immersing the contacting elements in a contacting paste;
pressing the contacting elements onto the electrodes in the connection region;
sintering thereby forming a sintered system;
attaching a glass preform to the sintered system so that the sensor element and at least the connection region are completely inserted in the glass preform; and
melting the glass preform to form the glass sheath.

17. The method according to claim 16, wherein melting comprises heating the glass preform to a temperature above a glass softening temperature.

18. The method according to claim 16, wherein the glass sheath comprises a recrystallizing barium zinc silicate glass.

19. The method according to claim 16, wherein an area of the contacting elements immersed in the contacting paste is smaller than an edge length of the ceramic base body.

20. The method according to claim 16, wherein the contacting elements comprise a nickel-iron alloy or silver with small amounts of nickel, and/or wherein the contacting elements comprise a protective layer, the protective layer comprising Ni, Cu or Ag.

21. A method for producing a sensor arrangement, the method comprising:
providing a sensor element comprising a ceramic base body and at least two electrodes;
providing at least two contacting elements and partially immersing the contacting elements in a contacting paste;
pressing the contacting elements onto the electrodes in a connection region;
sintering thereby forming a sintered system;
providing a ceramic cap and partially inserting the sintered system in the ceramic cap;
partially filling the ceramic cap with a glass paste at a defined speed;
further inserting the sintered system into the ceramic cap partially filled with glass paste at a defined speed so that the sensor element and the connection region are completely arranged in the ceramic cap;
laterally moving the ceramic cap at a predetermined speed to wet the sensor element and the connection region with the glass paste;
further filling the ceramic cap with the glass paste so that the sensor element and at least the connection region are completely enclosed by the glass paste to form a glass sheath;
drying; and
glazing.

22. The method according to claim 21, wherein glazing comprises heating the glass sheath to a temperature above a glass softening temperature and melting the glass sheath.

23. The method according to claim 21, wherein, prior to further inserting the sintered system into the ceramic cap, laterally moving the ceramic cap at a predetermined speed for distributing the glass paste in the ceramic cap.

* * * * *